Patented Aug. 22, 1933

1,923,715

UNITED STATES PATENT OFFICE 1,923,715

USEFUL LACQUER COMPOSITION MADE FROM LOW BOILING SOLVENTS

Theodore F. Bradley, Westfield, N. J., assignor to Ellis-Foster Company, Montclair, N. J., a Corporation of New Jersey No Drawing. Application July 11, 1928
Serial No. 292,034

9 Claims. (Cl. 134—26)

This invention relates to useful lacquer compositions made from low boiling solvents, and relates particularly to nitrocellulose lacquers which are rendered satisfactory for use through the introduction of assimilable synthetic resins or synthetic balsams.

It is well recognized in the present art that nitrocellulose coating compositions require the use of nitrocellulose solvents which are less volatile than the diluents employed. For example, when ethyl acetate is employed as a nitrocellulose solvent, one must have a diluent which is more volatile than said ethyl acetate, otherwise, the resulting compositions will, during the drying process, cause precipitation of the nitrocellulose and formation of cloudy opaque films. The only exception to such rule occurs when constant boiling mixtures are formed in which a sufficient amount of solvent is present to maintain the nitrocellulose in proper solution. In such case, however, the diluent is not more volatile than the solvent owing to the formation of the constant boiling point mixture. This invention therefore contemplates the practical utilization of solvent mixtures which heretofore have been impracticable to the prior art and in which one successfully employs a nitrocellulose solvent which in admixture with a diluent is less volatile than said diluent. Thus, in the compositions of the prior art such mixtures would form opaque non-homogenous films of no great value, but when employed in the manner hereinafter set forth are found to produce satisfactory compositions.

In order to overcome the formation of opaque films the prior art has employed certain amounts of high boiling nitrocellulose solvents such as, for example, butyl acetate, amyl acetate, butyl propionate, and the like. These high boiling solvents have resulted in improved gloss and flowing qualities and besides avoiding precipitation of the nitrocellulose by the diluents have also acted as water eliminants and thus prevent the formation of opaque films ordinarily produced when drying is conducted under humid conditions.

When employing only low boiling solvent mixture opaque films are often obtained, even though the diluent be more volatile than the solvent, owing to the action of moisture in the air which is condensed on the film through the very rapid drying which occurs and thus causes precipitation of the nitrocellulose. The present invention is, however, not concerned with the use of high boiling solvents to overcome this as such are not needed to accomplish the desired results.

The utilization of such low boiling solvent mixtures is of great economic importance owing to the relatively low cost of such solvents, their abundant supply and their value in producing very quick drying coatings. It will therefore be apparent that any method for securing satisfactory compositions from such low boiling solvent mixtures will be of great importance to the entire industry.

According to the present invention certain synthetic resins and balsams are incorporated with nitrocellulose in such proportions as will prevent precipitation of the nitrocellulose, either by the moisture of the air, or by the use of such solvent mixtures as ordinarily cause said precipitation. Thus, through the action of said synthetic resinous bodies precipitation of the nitrocellulose is prevented and good transparent films are obtained which are entirely suited for commercial use.

The invention may be more clearly illustrated by the following examples:

Resin A

A synthetic resin suitable for the purposes of this invention may be prepared as follows:

| | Parts by weight |
|---|---|
| Glycerol (dynamite grade) | 100 |
| Phthalic anhydride | 160 |
| Distilled fatty acids of cottonseed oil | 90 |

This mixture is placed in a 150 gallon aluminum kettle equipped with a tight fitting cover and a 2 inch diameter aluminum reflux condenser, approximately 4 feet high. The cover should be provided with an opening for a standard varnish maker's thermometer and also an opening through which is inserted a ½ inch diameter aluminum pipe contacting with the reaction mixture and sealed at its extremity, the lower end being perforated with a number of small holes. Through this pipe one may pass carbon dioxide or nitrogen, or other inert gases, during the process of manufacture to provide agitation and to avoid any tendency to discoloration. The reaction mixture is heated in this apparatus over an oil or gas burner, or other suitable source of heat and the temperature carried to approximately 475° F. Care is taken to regulate the rate of heating in such manner as to prevent the contents of the kettle from foaming over. The temperature may be carried to 475° F. in from 1 to 1½ hours and should be maintained at this point for approximately one hour, until a sample when chilled sets to a hard slightly-brittle non-tacky solid. Such a material will have an acid number of approximately 20 and a softening point of approximately 62° C. when tested by the A. S. T. M. ball and ring method. The material is freely soluble in toluol, benzol, xylol, butyl acetate, ethyl acetate, acetone, cellosolve and numerous other lacquer solvents and blends in all proportions with nitrocellulose.

Resin B

Another suitable resin may be made in the same manner employing

| | Parts by weight |
|---|---|
| Glycerol (dynamite or C. P. grade) | 100 |
| Phthalic anhydride | 160 |
| Commercial double pressed stearic acid | 90 |

Resin C

Still another suitable resin comprises the heat reaction product of

| | Parts by weight |
|---|---|
| Water-white rosin | 67¾ |
| Phthalic anhydride | 135 |
| Glycerol | 71½ |
| Distilled fatty acids of cottonseed oil | 76 |

This mixture may be heated in an apparatus as described in the foregoing examples, but the temperature preferably is carried to 555° F. which temperature is maintained for 1 hour. The resulting resin has an acid number of from 38 to 42, and a softening point, determined by the ball and ring method, of approximately 60° C. This resin is superficially more resistant to the prolonged action of water than the foregoing resins.

In the preparation of suitable resins of this type, one may utilize any of the higher liquid or solid fatty acids alone, or with rosin, congo, or other highly acid natural resins, and also with various other monobasic acids, in addition to phthalic acid or its anhydride or their equivalent polybasic acids. Likewise, one may utilize polyhydric alcohols other than glycerol such as ethylene, propylene, butylene and amylene glycols, diethylene glycol (di hydroxyl ethyl ether) and its higher homologues as well as the analogous derivatives of the higher glycols, tri methylene glycol, and the like. These alcohols form softer materials than does glycerol, generally of viscous liquid nature and may thus be termed balsams rather than resins. Some specific examples of such are hereinafter given. Likewise, one may employ pentaerythritol, mannitol, sugars, starches and various other hydroxylated bodies which in general give harder resins than glycerol. Thus, the hardness is influenced in a large measure by the number of hydroxyl groups present in the polyhydric alcohol which is employed. All such bodies are of value for the purposes of this invention. Among the synthetic balsams of value for the purposes of this invention are the following:

Balsam D

| | Parts by weight |
|---|---|
| Diethylene glycol | 106 |
| Cocoanut oil | 100 |
| Phthalic anhydride | 148 |

This mixture may be heated in apparatus previously described for the resin manufacture and the temperature may be carried to as high as 290° C. without fear of forming an infusible product. In general, it is not necessary, however, to carry the temperature above 260° C., one hour's reaction at such temperature being sufficient. Such reaction product is a pale, highly viscous liquid of low acid number, freely soluble in the ordinary lacquer solvents and well suited for use as a flexibilizing agent for nitrocellulose up to the proportion of 2 parts by weight of balsam to 1 part of nitrocellulose. Used alone with nitrocellulose or in admixture with the synthetic resins of this invention one can employ the solvent mixtures herein disclosed with good results.

Balsam E

| | Grams |
|---|---|
| Ethylene glycol | 65 |
| Linseed oil | 200 |
| Phthalic anhydride | 148 |

Heated in the foregoing manner, but to a temperature of 295° C. which was maintained for one hour, a viscous, transparent liquid was formed. This blends well with nitrocellulose in many ordinary solvent mixtures and can be used in place of Balsam D if desired.

It is to be noted that one need not employ fatty acids for these products as is generally necessary in the preparation of the corresponding glyceride resins inasmuch as the glycerides of the fatty acids may be used directly. Of course, one may employ the fatty acids, but in general it is more economical to utilize the natural vegetable and marine oils, rather than their fatty acids. All of these oils may be used, although some troubles are occasionally experienced with tung oil owing to its tendency to polymerize upon heating.

Resin F

| | Parts by weight |
|---|---|
| Pentaerythritol | 50 |
| Phthalic anhydride | 80 |
| Di hydroxy stearic acid | 40 |

This mixture when heated in the foregoing manner to a temperature of 240° C. (which was maintained for but 15 minutes) gave a hard resin melting at 70° C. It was soluble in numerous lacquer solvents and was found to be of considerable value. Similar products made with other fatty acids gave good results as well.

From these resins coating compositions were prepared as follows:

50 parts by weight of synthetic Resin A was dissolved in 50 parts by weight of acetone to form a 50 per cent solution. Likewise, ½ second viscosity nitrocellulose was dissolved in acetone to form a 20 per cent solution by weight. A lacquer was then prepared by blending 3 vols. of the 50 per cent resin solution with 3 vols. of the 20 per cent nitrocellulose solution and adding thereto 4 vols. of commercial toluene. The product was a clear, transparent, homogeneous solution which when flowed on glass slides and other surfaces and allowed to air-dry at a temperature of 78° F. relative humidity 71 per cent, formed clear transparent films. This was indeed surprising for an identical mixture made from nitrocellulose without any resin immediately formed under the same conditions a completely opaque, white film which was devoid of all strength and of no value for use as a coating. Moreover, the introduction of ordinary resins known to the art, such as rosin ester, dammar, and so forth, did not inhibit the blushing phenomena and as with the nitrocellulose alone, immediately formed opaque films of inconsequential value.

This constitutes an extreme case of this invention for here we have a nitrocellulose solvent, (that is, acetone) of extremely low boiling point and of very great volatility, admixed with a non-solvent diluent or precipitant for nitrocellulose which has a very much higher boiling point and is less volatile than the solvent employed. Thus, under ordinary circumstances, during the drying of a solution of nitrocellulose in the aforesaid solvent mixture the nitrocellulose solvent is volatilized at a much greater rate than the diluent, causing immediate precipitation of the nitrocellulose and resultant formation of opaque films, if they can, in fact, be considered films at all, from the standpoint of the coating art. Through the introduction of the synthetic resin the conditions are entirely changed. It was found that the moisture of the air was sufficient to cause the formation of opaque films in these experiments, the toluol also acted as a nitrocellulose precipitant. The foregoing tests, for example, were repeated, but drying was conducted in a closed desiccator over concentrated sulphuric acid, giving a humidity of about zero per cent. Under these conditions the films of nitrocellulose and of nitrocellulose with ordinary resins continued to dry to opaque or non-homogeneous surfaces, while those containing the synthetic resins dried clear and transparent as usual. Thus, it is shown that the toluol being less volatile than the acetone causes precipitation of the nitrocellulose during the drying operations unless said synthetic resins be used.

While the exact mechanism of these phenomena has not as yet been definitely determined, two theories which seem to have some basis in fact are as follows:

First: These synthetic resins by reason of their chemical constitution apparently possess an appreciable solvent action for the nitrocellulose, thereby preventing the precipitation of nitrocellulose by a liquid non-solvent.

Second: It is noted that the use of these resins slows down the rate of drying somewhat and perhaps causes the retention of a greater proportion of acetone over a longer period than would otherwise occur.

This invention is not to be prejudiced by these theories, however, since the new principle thus experimentally determined constitutes an important commercial advancement and should therefore be interpreted broadly.

The invention is not limited to any particular solvents such as acetone and toluol, since one may employ various other solvent mixtures which operate in identically the same manner. Thus, one may employ mixtures of acetone and benzol, ethyl methyl ketone and benzol or toluol, methyl or ethyl acetate and benzol, ethel acetate and toluol, or various mixtures thereof. In some cases, one may employ alcohols as diluents to replace the hydrocarbon diluents in part.

Other specific examples are as follows:

50 parts by weight of synthetic Resin B was dissolved in 50 parts by weight of ethyl acetate to form a 50 per cent resin solution. A 25 per cent solution of ¼ second viscosity nitrocellulose was likewise prepared by dissolving 50 parts by weight of commercial ¼ second viscosity nitrocellulose, wet with 30 per cent of alcohol, in 90 parts by weight of ethyl acetate. To 5 parts by weight of said resin and said nitrocellulose solutions, I added 3 parts by weight of toluol. The resulting solution dried clear and transparent at room temperatures. Mixtures in the same proportions made with synthetic Resins A and C likewise dried clear and transparent, while rosin ester under the same conditions formed cloudy, opaque surfaces, as did also nitrocellulose when used alone. The same procedure using benzol as a diluent likewise gave clear and transparent films in the case of the synthetic resins. It was also found possible to employ various mixtures of acetone, ethyl methyl ketone, ethyl acetate and methyl acetate, and similar low boiling solvents with benzol and toluol and other diluents which normally do not function properly except in the presence of a high boiling solvent like butyl acetate, or the like.

One may employ very wide ranges of proportions in the manufacture of compositions in accordance with this invention, although it is usually necessary to employ more synthetic resin than nitrocellulose in order to form the clear and transparent films which are requisite. Thus, when the compositions contain nitrocellulose in greater proportion than synthetic resin, one is apt to secure films which become more and more opaque as the content of nitrocellulose is increased and the content of synthetic resin is decreased.

In preparing suitable lacquers one may, of course, utilize the usual nitrocellulose plasticizers as flexibilizing agents, and in particular the phthalate plasticizers or their equivalents.

These compositions may advantageously comprise proportions ranging from equal parts of nitrocellulose and synthetic resin to proportions as high as 20 parts of resin to 1 of nitrocellulose.

Further unique advantages gained through the use of these synthetic resins are a remarkable increase in durability. Thus, compositions containing 3 or more parts of resin to 1 of nitrocellulose form clear, transparent films which will be more durable on exterior exposure than spar varnish made to meet the specifications of the United States Government.

These coating compositions may be pigmented when desired and new and improved stains and enamels are thus produced adapted to displace a large amount of paint and varnish and other types of coating materials heretofore employed. Owing to the low cost of the new solvent mixtures these compositions can be produced at extremely low prices and thus one secures both the lower price feature and improved quality, a combination of qualities always sought by the manufacturer and user, but seldom realized.

Thus, broadly, this invention comprises and discloses lacquer compositions containing nitrocellulose dissolved in a solvent for the nitrocellulose and a diluent, said solvent in admixture being more volatile than said diluent, thus ordinarily, on drying, causing the precipitation of the nitrocellulose with the formation of worthless opaque films, which usual course of events is readily frustrated through the introduction of a synthetic resin or resins, or balsam, which prevent the precipitation of the nitrocellulose and allows the formation of clear transparent films. More specifically the invention relates to a coating composition comprising low viscosity nitrocellulose in minor proportion, a synthetic resin assimilable therewith present in major proportion; all dissolved in a composite highly volatile solvent in which nitrocellulose alone is blush-forming; the assimilable synthetic resin preferably being of the polyhydric alcohol (e. g., glycerol or glycol) polybasic acid type normally modified by a monobasic acid such as a fat-acid.

These compositions are of value for many purposes such as for grease-proofing paper containers for food products where high boiling odoriferous solvents are particularly objectionable owing to their retention and consequent contamination of food products. Likewise, these compositions, pigmented or unpigmented, are of particular value for use on wood or metal surfaces, forming lacquers which may be used under industrial conditions for finishing furniture, toys, machinery, and so forth, and are capable of being produced at a very reasonable cost. In some cases one may advantageously incorporate natural resins, preferably the harder grades of such resins, only in such proportions as do not cause precipitation of the nitrocellulose. In other words, sufficient synthetic resin must be present to act as a blending agent and thus overcome precipitation of any of the solids by the solvent mixture employed.

What I claim is:—

1. A nitrocellulose solution which contains a solvent for the nitrocellulose and a diluent which in admixture is less volatile than the solvent, thus ordinarily causing precipitation of the nitrocellulose with the formation of opaque films when allowed to dry, and a synthetic polyhydric alcohol-organic acid complex of the resin-balsam class which prevents said precipitation of the nitrocellulose and causes the formation of clear, transparent films.

2. A coating composition which contains nitrocellulose and a solvent for the nitrocellulose, and a diluent which in admixture is less volatile than the solvent, thus ordinarily causing precipitation of the nitrocellulose with the formation of opaque films when allowed to dry, and a polyhydric alcohol-poly-basic acid complex of the resin-balsam class which prevents said precipitation of the nitrocellulose and causes the formation of clear, transparent films.

3. A solution of nitrocellulose and a synthetic polyhydric alcohol - polybasic acid - monobasic acid complex of the resin-balsam class, said solution containing a nitrocellulose solvent and a hydrocarbon diluent, said solvent being more volatile than said diluent, said solution being capable of drying at ordinary room temperatures and under varied conditions of atmospheric humidity to yield clear, transparent films.

4. A coating composition of nitrocellulose, a glycerol-phthalic-cottonseed oil fatty acids condensation product, acetone, and toluene, said composition yielding a coating substantially free from blushing.

5. A coating composition of nitrocellulose, a glycerol-phthalic-cottonseed oil fatty acids condensation product, a low boiling solvent, and a nitrocellulose non-solvent diluent boiling above said solvent, said composition yielding a coating substantially free from blushing.

6. A coating composition of nitrocellulose, a synthetic resin compatible with nitrocellulose, acetone, and toluene, said composition yielding a coating substantially free from blushing.

7. A coating composition of nitrocellulose, a polyhydric alcohol-non-fatty organic carboxylic acid-fatty acid complex, a low boiling solvent, and a nitrocellulose non-solvent diluent boiling above said solvent, said composition yielding a coating substantially free from blushing.

8. A coating composition of nitrocellulose, a polyhydric alcohol-non-fatty organic carboxylic acid-fatty oil acid-natural resin complex, a low boiling solvent, and a nitrocellulose non-solvent diluent boiling above said solvent, said composition yielding a coating substantially free from blushing.

9. A coating composition of nitrocellulose, a polyhydric alcohol-non-fatty organic carboxylic acid-fatty oil complex, a low boiling solvent, and a nitrocellulose non-solvent diluent boiling above said solvent, said composition yielding a coating substantially free from blushing.

THEODORE F. BRADLEY.